Nov. 15, 1932.  J. LE GALL  1,887,814
HOLLOW PANEL
Filed June 17, 1929   2 Sheets-Sheet 1
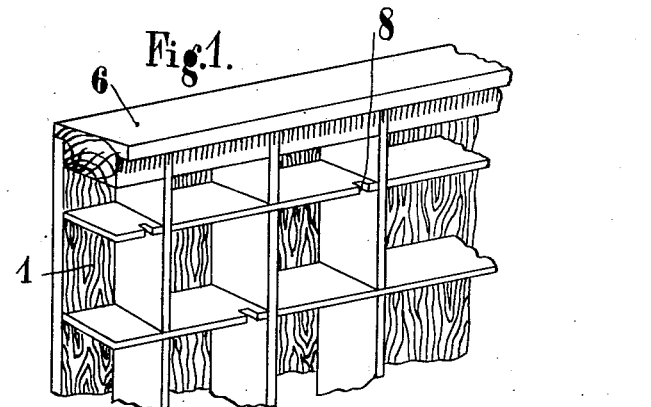
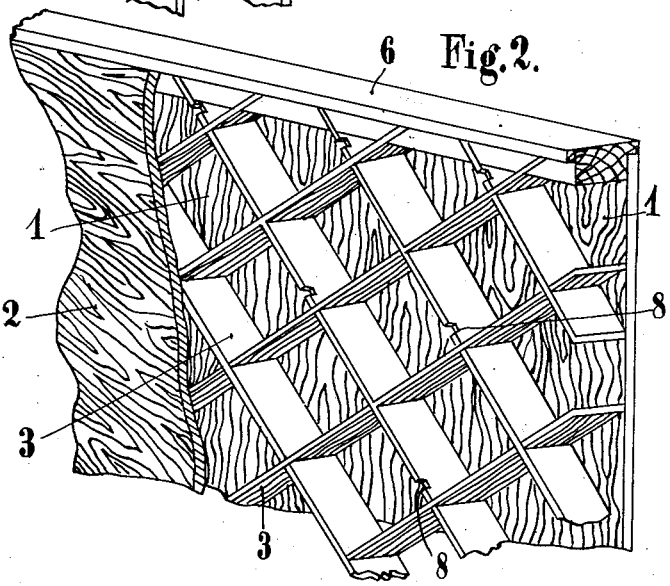
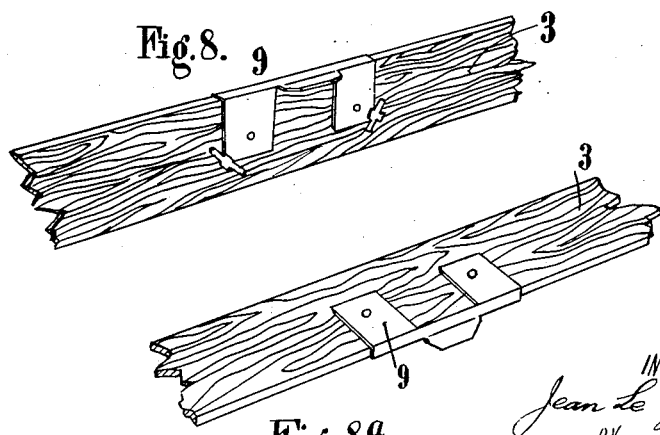
INVENTOR
Jean Le Gall
BY
Andrew T. Dupont
his ATTORNEY Nov. 15, 1932.　　　　J. LE GALL　　　　1,887,814
HOLLOW PANEL
Filed June 17, 1929　　　2 Sheets-Sheet 2
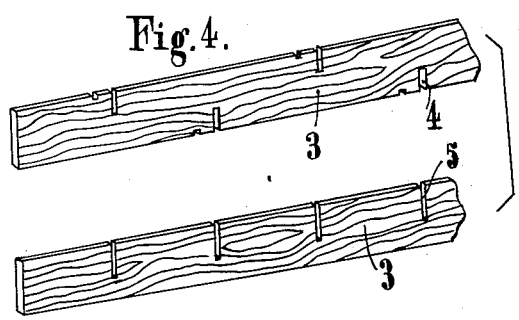
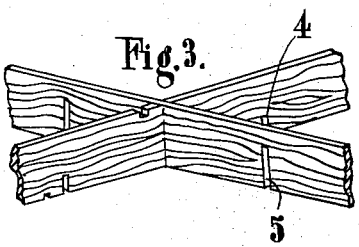
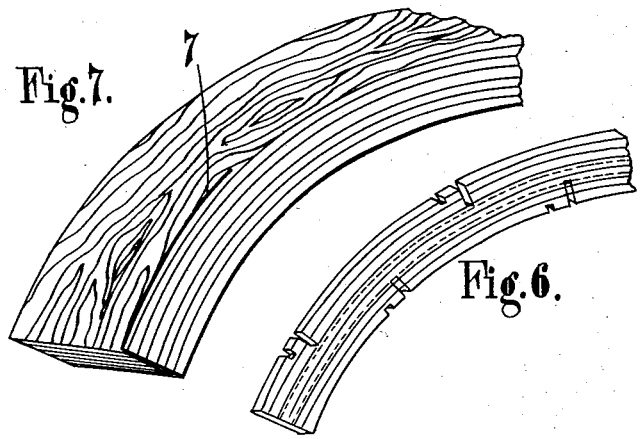
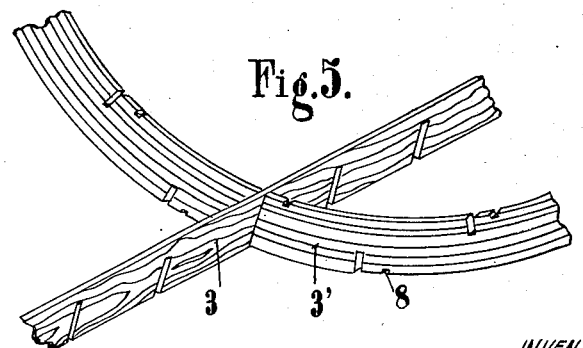

Patented Nov. 15, 1932

1,887,814

UNITED STATES PATENT OFFICE

JEAN LE GALL, OF NANTERRE, FRANCE

HOLLOW PANEL

Application filed June 17, 1929, Serial No. 371,519, and in Germany June 25, 1928.

This invention has for its object the provision of hollow panels suitable for the making of furniture, or any other application, characterized primarily in that the panel comprises two single- or ply-wood sheets separated from each other by a network formed of interlaced wood strips joined to one another by any suitable means and secured at right angles to said wood sheets by glueing or otherwise so as to form a honeycomb the cells of which communicate with each other by means of apertures provided therefor and affording an air circulation within the panel which may be closed at the periphery thereof by means of suitable strips.

According to a modification of the invention, one of the sheets may be a metal sheet, the network strips being secured to said metal sheet by suitable fastenings attached by soldering or welding or any method known in the art.

In order that the invention may more readily be understood, it will now be further described with the aid of the accompanying drawings.

In the drawings:—

Figure 1 is a fractional view showing an embodiment of the panel according to the invention, one sheet of the panel being omitted in order that the lattice-work within the same may be best seen.

Figure 2 is a modification of the lattice-work.

Figures 3 and 4 show the method of joining the strips of the lattice-work to one another.

Figure 5 shows the joining of straight strips with curved ones.

Figure 6 shows a curved strip for use in the structure shown in Fig. 5.

Figure 7 shows how a block formed of curved glued wood plies may be sawed up into curved strips as shown in Fig. 5.

Figure 8 shows a possible method for securing the strips where the panel comprises a metal sheet.

Figure 8ᵃ shows another view of same.

Referring first to Figs. 1 and 2, the outer surfaces of the hollow panel are indicated at 1 and 2. Glued intermediate between the surfaces in the above mentioned lattice-work which is formed of strips 3 assembled at right angles to one another or otherwise by means of suitable slots 4 and 5 (Fig. 4). The lattice-work may be arranged either at right angles to the sides, as shown in Figure 1, or diagonally as shown in Fig. 2. The extremities of strips 3 are secured to strips 6 as clearly shown in Figs. 1 and 2.

Figs. 3 and 4 will allow the structure of the above mentioned lattice-work to be fully understood.

In the case according to Fig. 5, this lattice-work comprises curved elements such as that shown at 3' in Fig. 5. In order that the elements 3' may retain a sufficient strength they will preferably be sawed up as shown in Figs. 6 and 7 from a block formed of superposed glued plies. The cutting up is done by means of a saw as shown at 7 in Fig. 7.

Provided at 8 in the strips 3 and 3' are notches intended to create within the panel an air circulation whereby the drying is facilitated and any warping is precluded.

As already mentioned, one of sheets 1 or 2 may be made of metal instead of wood. In this case, the network will be secured on the metal side of the panel by means of suitable fastenings such as that indicated at 9 in Fig. 8. These fastenings may be secured by electric welding or any other method. Any other suitable fastening means may be used.

It is to be understood that the panels made according to the invention may be made in any desired sizes and of any kind of wood.

I claim:

1. A hollow panel comprising a series of parallel strips having notches along one edge thereof, a second series of parallel strips having notches along one edge thereof, said strips of both series being adapted to be angularly assembled so that the respective notches on each series of strips will be juxtaposed, the strips of the second series being provided with additional notches along the other edge thereof, and a third series of strips parallel to said first mentioned series, having notches along one edge thereof adapted to be juxtaposed to the notches along the above mentioned other edge of the second series.

2. A hollow panel comprising a series of parallel strips having notches on one edge thereof, a series of parallel strips assembled angularly with respect to the strips of the first series and having notches disposed alternately on each edge of said strips of the second series, the strips being in crossed formation in the assembly of the two series of parallel strips, notches formed in the cross strips on opposite edges thereof to provide air circulation diagonally through the cells, and securing means arranged on the sides of said strips to connect the latter with the panel.

3. A hollow panel comprising two sheets separated from each other by a network formed of interlaced strips suitably joined together and secured at right angles to said sheets so as to form a honeycomb structure, the cells of which communicate with each other through notches formed in the edges of the strips affording an air circulation within the panel, one of said sheets being made of metal and having the interlaced strips secured thereto by partial fusion, such as soldering or welding.

4. A hollow panel comprising two sheets separated from each other by a network formed of interlaced parallel strips secured at right angles to the sheets so as to form a honeycomb, one series of said parallel strips being provided with notches along the same edge, while the parallel strips arranged at an angle to the first series are provided with corresponding notches arranged alternately on both edges thereof.

5. A hollow panel comprising two sheets separated from each other by a network formed of interlaced parallel strips secured at right angles to the sheets so as to form a honeycomb, one series of said parallel strips being provided with notches arranged along the same edge, while the parallel strips of the second series arranged at an angle to the first series are provided with corresponding notches arranged alternatively on both edges thereof, said second series of strips being also provided with a plurality of notches arranged on both edges thereof to provide a circuitous air circulation through the panel.

In testimony whereof, I affix my signature.

JEAN LE GALL.